United States Patent [19]
Land

[11] 3,753,392
[45] Aug. 21, 1973

[54] FILM-ADVANCING APPARATUS
[75] Inventor: Edwin H. Land, Cambridge, Mass.
[73] Assignee: Polaroid Corporation, Cambridge, Mass.
[22] Filed: Aug. 12, 1971
[21] Appl. No.: 171,127

Related U.S. Application Data
[63] Continuation-in-part of Ser. No. 65,053, Aug. 19, 1970, Pat. No. 3,683,771.

[52] U.S. Cl. ........................................ 95/13, 95/19
[51] Int. Cl. ............................................ G03b 17/50
[58] Field of Search ................................ 95/13, 19

[56] References Cited
UNITED STATES PATENTS

| | | | |
|---|---|---|---|
| 3,545,357 | 12/1970 | Erlichman | 95/13 |
| 3,563,145 | 2/1971 | Bendoni | 95/13 |
| 3,447,437 | 6/1969 | Tiffany | 95/13 |
| 3,505,943 | 4/1970 | Bellows | 95/13 |
| 3,511,152 | 5/1970 | Erlichman | 95/13 |
| 2,873,658 | 2/1959 | Land | 95/26 X |

Primary Examiner—Samuel S. Matthews
Assistant Examiner—Richard M. Sheer
Attorney—Charles Mikulka et al.

[57] ABSTRACT

Photographic apparatus including a camera for receiving a film assemblage and a film assemblage including a film cassette and a plurality of thin, flexible film units arranged in stacked relation therein. The film cassette has an exit in one end wall through which a foremost film unit is adapted to be moved after exposure and an opening located near an opposite end of the film cassette. The camera further includes film-advancing apparatus including a first component which is adapted to enter the opening in the cassette and engage the foremost film unit at or near an end thereof or at an edge thereof most distant from the exit and move the foremost film unit through the exit, and a second component including a pair of processing rollers which is adapted to receive the film unit and continue its movement toward the exterior of the camera while spreading a processing liquid between elements of the film unit to initiate formation of a visible image.

17 Claims, 7 Drawing Figures

INVENTOR.
EDWIN H. LAND

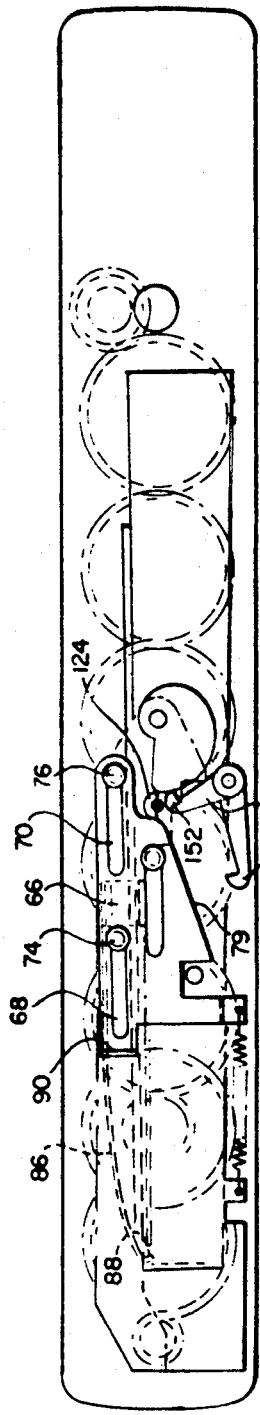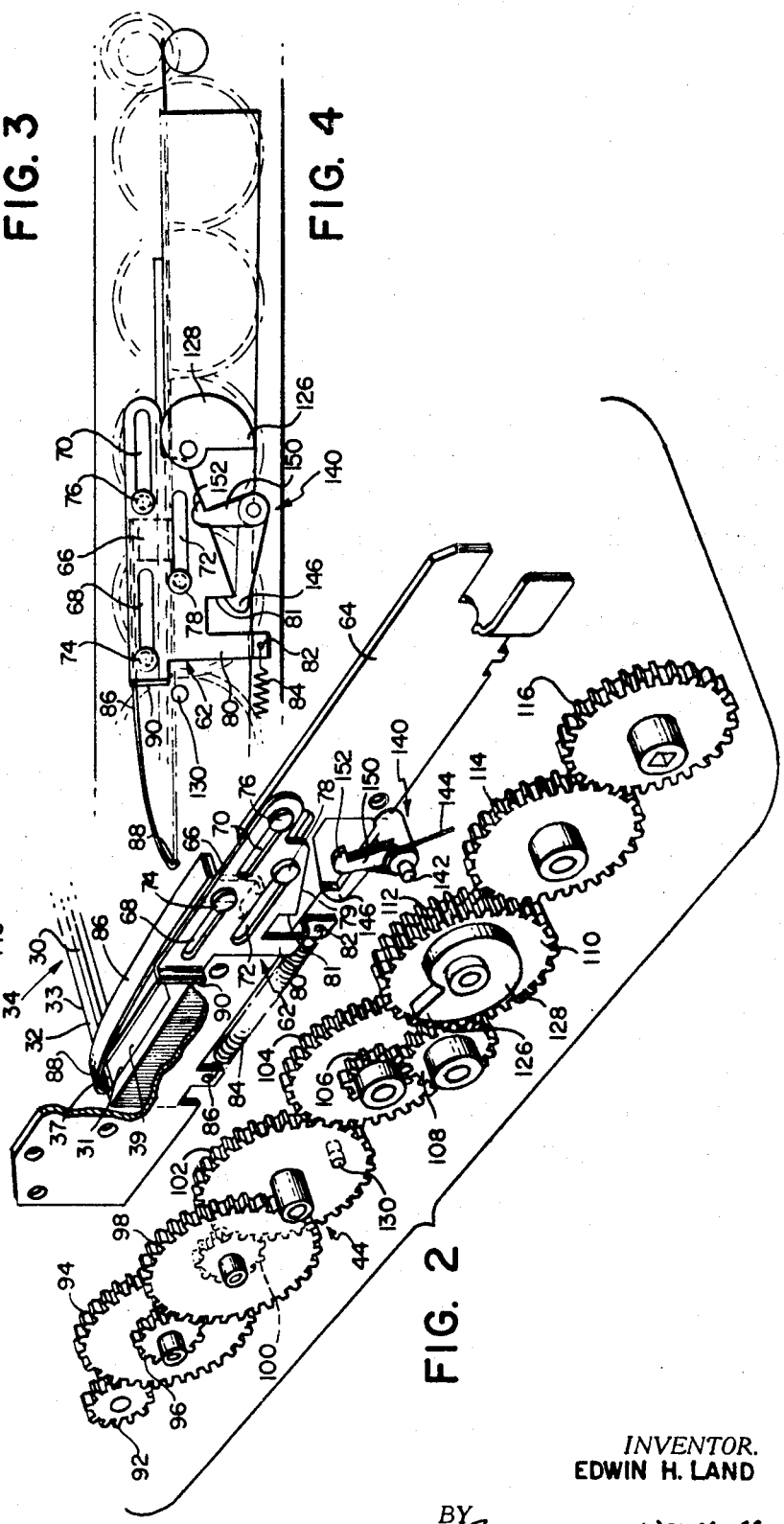

Patented Aug. 21, 1973

INVENTOR.
EDWIN H. LAND

BY Brown and Mikulka
and
Alfred E. Corrigan
ATTORNEYS

FILM-ADVANCING APPARATUS

CROSS-REFERENCE TO RELATED APPLICATION

This application is a continuation-in-part of my copending application, Ser. No. 65,053, filed Aug. 19, 1970 and now U.S. Pat. No. 3,683,771.

BACKGROUND OF THE INVENTION

1. Field of the Invention

This invention relates to film-advancing apparatus for use with cameras of the self-developing type.

2. Description of the Prior Art

The prior art is replete with film-advancing apparatus for use with cameras of the self-developing type. One class of film-advancing apparatus includes a member which is adapted to enter one of a series of indentations or apertures in a film unit prior to advancing the film unit out of its exposure position and a pair of processing rollers which are adapted to spread a processing liquid between elements of the film unit while simultaneously continuing the movement of the film unit toward the exterior of the camera. Disadvantages inherent in this class of film-advancing apparatus are readily apparent to those skilled in the art; e.g., providing the film unit with a plurality of indentations or apertures not only adds to the manufacturing cost of the film but it also adversely affects the aesthetics of the film unit where the film unit is intended to be the final product. A further disadvantage with this class of film-advancing apparatus is the problem involved in getting the film-engaging member of the apparatus into register with the aperture or indentation in the film unit without deflecting an end of the film unit located adjacent a withdrawal slot in a film cassette to a position out of alignment with the withdrawal slot. Also, if there is no initial registration, the film-advancing apparatus must be provided with means which can be operated continuously until the film-engaging member is in register with the film unit; i.e., it enters the aperture or indentation in the film unit so as to be able to move the film unit out of the exposure position.

A second class of film-advancing apparatus involves the use of a friction drive between the apparatus and a leading end portion of a film unit; e.g., see U. S. Pat. No. 3,447,437, wherein friction feed rollers are mounted near a leading end portion of the film unit for advancing the film unit into the bite of a pair of processing rollers. The term "leading end portion" as used herein is intended to mean that portion of the film unit which is closest to the film exit opening in the film cassette. However, again we have the problem that the engagement between the friction drive and the leading end portion of the film unit may cause the leading end of the film unit to be deflected to a position wherein it would be out of alignment with the exit opening in the cassette, thereby precluding movement of the film unit through the exit opening.

Still another class of film-advancing apparatus includes means for engaging a film unit near its trailing end and advancing the film unit into the bite of a pair of non-rotating processing rollers as shown in U. S. Pat. Nos. 2,477,324 and 2,873,658. The major drawback with apparatus of the type set forth in the latter two patents is that the film units used in U. S. Pat. No. 2,477,324 must be substantially rigid or thick in order to withstand the pressures exerted thereon in moving the film unit into the bite of the processing rollers, while the film units in U. S. Pat. No. 2,873,658 must be substantially rigid or thick in order to enable them to drive the processing rollers as they are moving therebetween. Needless to say, increasing the thickness and/or rigidity of a film unit adds to the manufacturing costs thereof, and in the case of increased thickness, subtracts from the compactness of the film cassette (assuming a constant number of film units) and the camera with which the cassette is adapted to be used.

SUMMARY OF THE INVENTION

The invention relates to photographic apparatus and, more particularly, to film-advancing apparatus for use with a film assemblage of the type described in my copending application, Ser. No. 55,119, filed July 15, 1970 and now U.S. Pat. No. 3,651,746, and entitled "Film Assemblage."

The film assemblage described in my aforementioned copending application includes a film cassette of unitary construction including spaced forward and rear walls, a pair of side walls and leading and trailing end walls which cooperate to enclose a plurality of thin, flexible film units of the type more fully described in my U. S. Pat. No. 3,415,644. The film cassette's forward wall is provided with a rectangular exposure aperture which is generally coextensive with the area of the film unit to be exposed and at least one elongated slot which extends rearwardly along one lateral side of the forward wall and at least part way down the cassette's trailing end wall. One end of the container is provided with an elongated exit slot through which film units may be moved, one at a time i.e., the slot has a depth only slightly greater than the thickness of one film unit and less than the combined thickness of two film units, as more fully described in the aforementioned U.S. Pat. No. 3,415,644. A resilient platen is positioned between the stack of film units and a battery located adjacent the cassette's rear wall for urging a foremost film unit against the forward wall such that its photosensitive element is located in position for exposure and the leading end or edge of the film unit is in alignment with the exit slot.

The film assemblage is adapted to be located within a camera in position for exposure of the foremost film unit. Mounted within the camera is film-advancing apparatus including a film-engaging member which is adapted to extend into the slot in the cassette's forward and trailing end walls and engage the foremost film unit at or near its trailing end or at its trailing edge prior to moving it through the exit slot in the cassette and into the bite of a pair of rollers mounted adjacent a leading end of the foremost film unit. The rollers are adapted to receive the film unit as it is moved out of the exposure position through said exit slot and drive the film unit toward the exterior of the camera while simultaneously spreading a processing liquid between elements of the film unit.

In a preferred embodiment, the camera is provided with a battery operated motor for operating a gear train which is coupled with the film-advancing apparatus to provide for the continuous movement of the exposed film unit from the exposure position to the exterior of the camera. The film-advancing apparatus includes a reciprocating cantilever mounted member, the free end of which is adapted to engage the foremost film unit by its trailing end or edge and move the film unit out of the exposure position and into engagement with the rotating processing rollers. The rotating processing rollers continue the uninterrupted movement of the film unit toward the exterior of the camera while simultaneously rupturing a container of processing liquid located near the leading end of the film unit and spreading the liquid contents thereof between photosensitive and image-receiving elements of the film unit to initiate formation of a visible image within the film unit as is well known in the art. After the processing liquid has been spread between the photosensitive and image-receiving layers, at least a portion of the film unit is moved to the exterior of the camera where the user may grasp the film unit and after a predetermined period of time, view the positive image of the scene photographed. In an alternative embodiment, one of the components of the film-advancing apparatus, i.e., the processing rollers, may be manually operated. In the case where the rollers are manually operated, pregapping means are provided for initially spacing the processing rollers apart such the the film-engaging member may advance the foremost film unit to a position wherein a leading end portion of the film unit is between the rollers. After locating the leading end portion of the film unit between the rollers, and pregapping means are removed to allow the rollers to move toward each other and into engagement with the leading end portion of the film unit. The rollers are then manually rotated to advance the film unit toward the exterior of the camera while simultaneously spreading the processing liquid between the photosensitive and image-receiving elements of the film unit.

An object of the invention is to provide photographic apparatus including film-advancing apparatus comprising a pair of processing rollers and a film-engaging member mounted within a camera for engaging a thin, flexible film unit at or near its trailing end or at a trailing edge and advancing the film unit, subsequent to exposure, leading end first, through an exit slot in a film cassette and into the bite of the pair of processing rollers for subsequent delivery to the exterior of the camera and means for driving the film-advancing apparatus.

Still another object of the invention is to provide photographic apparatus including a camera having film-advancing apparatus for use with thin, flexible film units and including first means for engaging a film unit at or near its trailing end or at a trailing edge and advancing it, leading end first, out of its exposure position and second means mounted in position to receive the film unit, leading end first, and continue its movement toward the exterior of the camera, and means for operating said first and second means in unison with each other to provide for the uninterrupted movement of the film unit from the exposure position to a position wherein at least a portion of the film unit is located outside of the camera.

Another object of the invention is to provide photographic apparatus including a camera having film-advancing apparatus for use with a film cassette having a plurality of thin, flexible film units therein and including first means for engaging a film unit at or near its trailing end or at a trailing edge and advancing it, leading end first, through an adjacently located exit slot in the film cassette and second means mounted to receive the film unit, leading end first, and continue its movement toward the exterior of the camera, and means for operating said first and second means independently of each other.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in conjunction with the accompanying drawings wherein:

FIG. 2 is an enlarged, exploded perspective view of certain components of the camera shown in FIG. 1;

FIG. 3 is an elevational view of the components of FIG. 2 shown in an assembled condition;

FIG. 4 is a view similar to FIG. 3 showing the relationship between components during an intermediate phase of their operation;

DETAILED DESCRIPTION OF THE INVENTION

Figure 1:
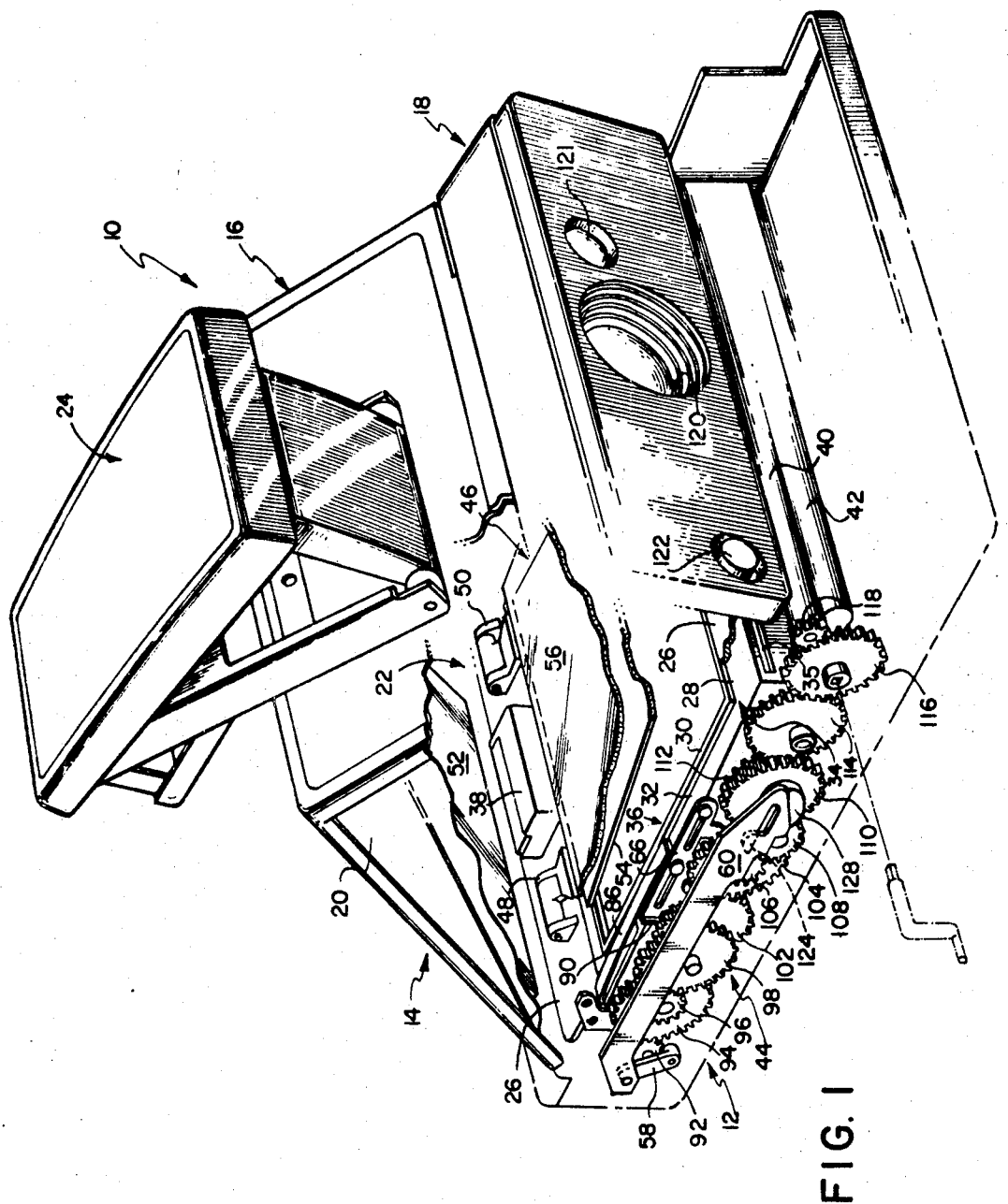
FIG. 1 is a perspective view, partly in section, of a folding type, self-developing camera of the single-lens reflex type which incorporates the instant invention.
Figure 5:
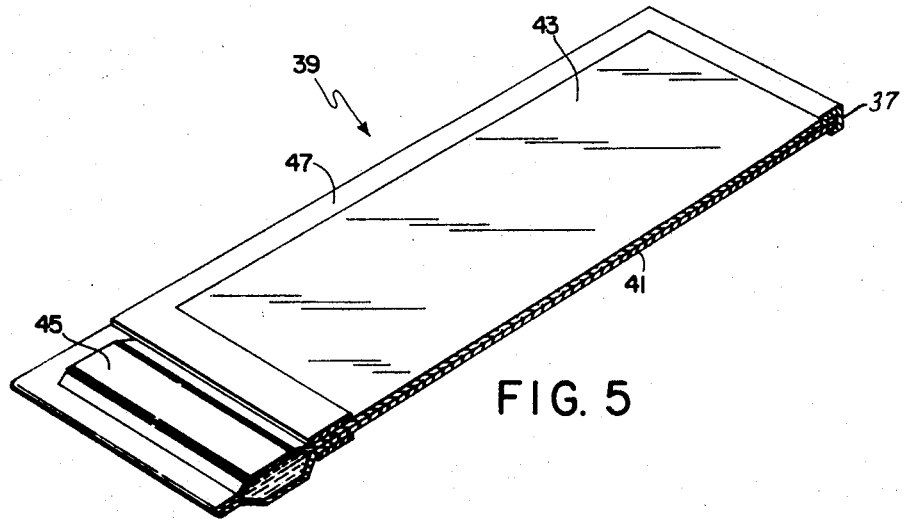
FIG. 5 is a perspective view of a portion of a film unit with which the instant invention is especially adapted for use.

Reference is now made to FIG. 1 of the drawings wherein is shown a foldable camera 10 of the self-developing, single-lens reflex type similar to that shown in the copending application of P. Costa et al., entitled, "Folding Camera," Ser. No. 141,554, filed on May 10, 1971, and assigned to the same assignee as the instant application. Although the invention is described in conjunction with a folding camera, it should be noted that the invention applies equally as well to cameras of the non-folding type. As more fully described in the aforementioned application, camera 10 includes a plurality of housing sections 12, 14, 16 and 18 which cooperate with a flexible opaque bellows 20 to define sides of an exposure chamber 22. Housing sections 12, 14, 16 and 18 are pivotally coupled for movement, along with a collapsible viewfinder 24, from the operative position shown to a folded or collapsed position wherein the camera 10 assumes a slim, compact configuration which readily lends itself to carriage in the pocket of the user.

Housing section 12 includes a generally rectangular shaped member 26 having a rectangular shaped opening 28 therein. Opening 28 is adapted to receive an upstanding rib 30 located on the forward wall 32 of a film cassette 34 for properly positioning the foremost film unit located within the cassette in position for exposure to light transmitted through cassette exposure opening 36. A spring wound or battery driven motor 38 is located near one end of opening 28 and a pair of rollers 40 and 42 having suitable means for resiliently biasing the rollers toward each other is mounted adjacent an opposite end of opening 28. Motion-transmitting means in the form of a gear train 44 extends along one side of member 26 and is coupled between the motor 38 and roller 40 for driving the latter in a counterclockwise manner (as viewed in FIG. 1) to transport a film unit engaged between the rollers toward the exterior of the camera.

Camera 10 is provided with a reflex member 46 pivotally attached to rectangular shaped member 28 at lugs 48 and 50 for movement between a viewing position wherein it cooperates with rib 30 on cassette 34 to define a lighttight seal therebetween, and an exposure position wherein it lies closely adjacent a mirror 52 mounted on an interior surface of housing section 14. The reflex member 46 includes a support (not shown) having a mirror or similarly specularly reflecting surface 54 on one side thereof and a viewing surface 56 on the other side configured to have a texture and optical design to facilitate focusing of the image. Reflex member 46 is spring loaded to the up or exposure position and is provided with a linkage system including a crank 58 and ram 60 for moving the reflex member 46 to the down or viewing and focusing position.

Figure 6:
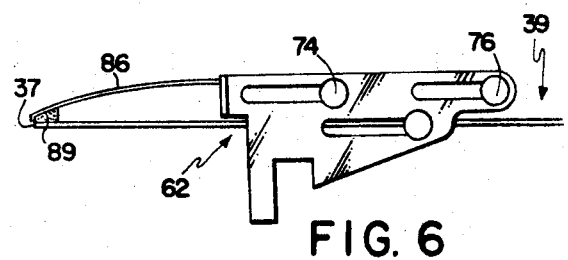
FIG. 6 is an elevational view of a modified film-advancing means.

The film-advancing apparatus of the camera includes a first component or first film-advancing means for engaging a film unit, subsequent to exposure, and moving it into the bite of a second component or second film-advancing means, i.e., rollers 40 and 42, for subsequent delivery to the user of the camera. The first component of the film-advancing apparatus (see FIG. 2) includes a generally T-shaped member 62 mounted on a flange 64 for reciprocating motion, i.e., toward and away from the rollers 40 and 42. T-shaped member 62 includes a main body portion 66 having three elongated slots 68, 70 and 72 therein which are adapted to slideably receive pins 74, 76 and 78 mounted on flange 64. Pins 74, 76 and 78 have enlarged end portions for retaining T-shaped member 62. Member 62 further includes a leg 80 having a hole 82 therein for receiving one end of a spring 84. Spring 84 has its other end connected at 86 to flange 64 for resiliently biasing T-shaped member 62 toward the left, i.e., away from the rollers 40 and 42. A resilient arm 86 extends from one end of T-shaped member 62 in cantilever fashion and includes a downwardly turned film-engaging member 88 which is adapted to engage the trailing edge 37 of a film unit 39 prior to moving it out of the cassette 34 via exit 35 and into the bite of rollers 40 and 42. It will be noted that member 88 is configured such that its free end does not extend to a position wherein it could engage the trailing edge of more than one film unit. Alternatively, member 88 could be replaced by a block of resilient material 89 having a high coefficient of friction, e.g., polyurethane foam, as shown in FIG. 6. Material 89 may be adapted to engage either the top surface of the film unit or it may engage the top and trailing edge surfaces simultaneously. In any event, the engagement between the film-engaging member and the film unit is at a location outside of the area in which the image is to be formed. Also extending from T-shaped member 62 is a flange 90 which is adapted to be engaged by means to be described later for moving the first component of the film-advancing apparatus from the position shown in FIG. 2 to a second position wherein the film unit is advanced into engagement with the second component, i.e., the rollers 40 and 42.

Returning briefly to the gear train 44, it can be seen that it includes a plurality of gears 92 – 116. The gear train includes two power paths, i.e., one which couples the gear 118 located on one end of roller 40 with drive gear 92 and a second path which interconnects drive gear 92 with a timing gear 110. The first path includes drive gear 92 (which is coupled to the motor 38), idler gears 94, 98, 102, 104, 112, 114 and 116, reduction gears 96 and 100, integral with gears 94 and 98, respectively, and roll drive gear 118. The second path includes drive gear 92, idler gears 94, 98, 102, 104 and 108, reduction gears 96, 100, 106 and timing gear 110. Obviously, timing gear 110 rotates completely independent of idler gear 112 and reduction gear 106 is integral with idler gear 104.

During the focusing mode of operation, reflex member 46 is in the down position closely adjacent the film container 34; the camera's shutter and lens assembly 120 is open to allow the entry of light into chamber 22; and the remaining sub-systems, i.e., the gear train 44, ram 60 and crank 58 assume positions substantially as shown in FIGS. 1 and 3. After the image has been properly focused on viewing surface 56, as seen through viewfinder 24, the camera's shutter release button 122 is depressed to initiate operation of the camera's control program as more fully described in the commonly assigned copending applications of Edwin H. Land et al., Ser. No. 134,733 filed April 16, 1971, and entitled, "Reflex Camera," and Edwin K. Shenk, Ser. No. 134,725, filed April 16, 1971, and entitled, "Reflex Camera with Motor Drive."

Initiation of the control program fully closes the shutter 120 and closes the circuit to motor 38. Motor 38 drives the gear train 44 for a period of time sufficient to rotate a point on timing gear 110 counterclockwise through an angle of approximately 10°. As noted previously, reflex member 46 is spring biased toward the up position. However, reflex member 46 is prevented from moving to the up position because of its connection with link 58 and ram 60. Ram 60 (see FIG. 1) has a cam follower 124 mounted on one side thereof which is in engagement with the high point 126 of a cam 128 fixedly mounted on timing gear 110, when the image is being focused. Rotation of timing gear 110 in a counterclockwise direction moves the high point 126 of cam 128 to a position allowing the ram 60, which is being urged to the right by the reflex member up springs, to move to the right as the reflex member moves to the up or exposure position. The shutter 120 is then opened and image-producing light is directed along an optical path and reflected by mirror 54 toward cassette 34 to expose the foremost film unit, i.e., the one closest to wall 32 of cassette 34. A photocell 121 provides an input to the control system for closing the shutter when the correct exposure time has elapsed. After the shutter has been closed, the motor 38 is started again to drive the gear train 34. This second starting of the motor 38 rotates gear 102 and pin 130, which extends from gear 102 inwardly toward frame member 64, in a clockwise direction. During this rotation, pin 130 revolves into a position wherein it engages flange 90 and moves the first component of the film-advancing apparatus including film-engaging section 88 to the right (as viewed in FIG. 1) to move the exposed film unit into the bite of the rotating rollers 40 and 42. As best seen in FIG. 2, film cassette 34 has an elongated opening 31 in forward wall 32 which extends part way down the trailing end wall 33 of the cassette. Opening 31 allows film-engaging section 88 to extend into the cassette to a position just rearwardly of the trailing edge 37 of a film unit 39 in preparation for moving the film unit through exit 35 (see FIG. 1) in cassette 34 and into the bite of rollers 40 and 42.

At this point it should be noted that film units 39 which consist chiefly of superposed photosensitive and image-receiving elements 41 and 43, respectively, a rupturable container 45 containing a supply of processing liquid and means 47 for securing the elements 41 and 43 in face-to-face relation, are relatively thin and flexible. For example, the maximum thickness of a film unit at a point intermediate its ends is approximately 0.014 inch, while that at container 45 is approximately 0.048 inch. Since the leading end of the foremost film unit, i.e., the end having container 45, located within the cassette 34 is in alignment with the exit 35, it is especially beneficial to advance the foremost film unit by engaging the film unit at or near its opposite or trailing end or at its trailing edge rather than engaging the film unit near its leading end. The reason for this is that engagement of the thin, flexible film unit near its leading end may result in deflecting a portion of the leading end of the film unit out of alignment with the exit 35, thereby preventing movement of the film unit into the bite of rollers 40 and 42. In other words, if any deflection of the film unit is to take place in response to engagement of the film unit by the film-engaging member, it should take place at a position remote from the leading end of the film unit.

Rollers 40 and 42 apply compressive pressure to the container 45 of processing liquid located near the leading edge of the film unit to rupture the container and spread the contents thereof between the photosensitive and image-receiving elements of the film unit to initiate a diffusion transfer process of the type described in U.S Pat. No. 3,415,644. After the processing liquid has been spread, rollers 40 and 42 transport the film unit to the operator of the camera in a condition which does not require any other mechanical processing. Shortly after the processing liquid has been spread between elements of the film unit, the high point 126 on cam 128 rotates to a position in which it now drives cam follower 124 and ram 60 to the left, thereby driving reflex member 46 to the down position. The shutter 12 now is allowed to assume a fully open condition as the circuit to the motor 38 is opened to complete the cycle.

The gear ratio between the various gears in gear train 44 is such that gear 102 must rotate through more than one revolution in order for the rollers 40 and 42 to be driven a sufficient period of time to move the exposed film unit out of engagement with the rollers. For that reason, a disenabling means in the form of a latch 140 is provided for holding T-shaped member 62 in the second position, i.e., to the right, for a period of time at least sufficient to enable the exposed film unit to move out of engagement with the rollers 40 and 42. By thus holding T-shaped member 62 in the second position, flange 90 is maintained in a position which precludes repeated engagement by pin 130 during subsequent revolutions of gear 102 and the resulting actuation of the film-engaging member 88 to move another film unit out of the cassette 34 before the film unit has been exposed. Latch 140 is pivotally coupled to flange 64 by a pin 142 and is resiliently biased in a clockwise direction by any suitable means such as spring 144. Latch 140 includes a detent 146 which is adapted to be cammed downwardly against its spring bias by inclined surface 79 of T-shaped member 62 as the latter moves toward the right. When T-shaped member 62 reaches its second position, i.e., the film unit is now in the bite of the rollers 40 and 42 and the T-shaped member is in the position shown in FIG. 4, detent 146 is urged by spring 144 in a clockwise direction into a recess 81 in T-shaped member 62 to releasably retain the latter against movement to the left under the influence of spring 84. A release member including an arm 150 having a cam follower 152 at its end extends from latch 140 and is adapted to be engaged by a peripheral surface of cam 128 for rotating latch 140 in a counterclockwise direction to move detent 146 out of recess 81, thereby allowing T-shaped member 62 to return to its first or starting position (see FIG. 3) under the influence of spring 84. This latter movement of arm 150 from the position shown in FIG. 4 to the unlatching position occurs just prior to cam 128 rotating in a counterclockwise manner into the position shown in FIG. 3. Accordingly, cam 128 functions to drive reflex member 46 to the down position and as an enabling means for permitting the first component of the film-advancing apparatus, i.e., film-engaging member 88, to return to the position shown in FIG. 3.

Figure 7:
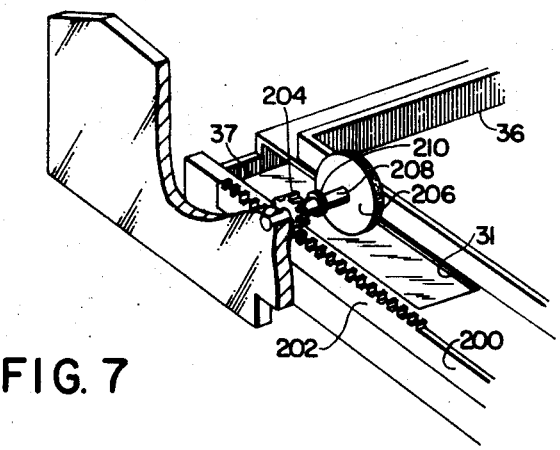
FIG. 7 is an elevational view of still another modified type of film-advancing means.

An alternative embodiment of the first component of the film-advancing apparatus is shown in FIG. 7. In this embodiment, arm 86 is replaced by a rack 200 extending rearwardly from T-shaped member 62. Rack 200 includes a plurality of teeth 202 operatively meshed with the teeth of a gear 204 for rotating the latter upon reciprocating movement of the former. Gear 204 is drivingly coupled to a disc or wheel 206 by a shaft 208 and a one-way clutch 210. Wheel 206, which may be formed of any suitable material having a high coefficient of friction, e.g., rubber, is mounted in position to engage the foremost element located within the film cassette upon insertion of the latter into the camera. As is obvious from FIG. 7, movement of rack 200 to the right will produce a counterclockwise rotation of wheel 206 to move the foremost element out of the cassette and into the bite of rollers 40 and 42. After the foremost element (initially a dark slide and thereafter a film unit) has been moved out of the cassette, clutch 210 allows rack 200 to return to its original position without rotating wheel 206.

From the foregoing it can be seen that there has been disclosed a novel and reliable film-advancing apparatus for moving thin, flexible film units from an exposure position towards the exterior of the camera. The film-advancing apparatus includes two components which are operated to cooperate with each other to provide for the uninterrupted movement of the exposed film unit from its exposure position to a position in which the user can handle the film unit. However, it should be noted that the movement of the exposed film unit toward the exterior of the camera may be in two or more stages. For example, gears 112 and 114 could be replaced by a hand crank operatively coupled to gear 116, as shown in phantom lines in FIG. 1, for allowing manual operation of the rollers 40 and 42. Where the second component of the film-advancing apparatus, i.e., rollers 40 and 42, are driven independently of the operation of the first component, it is preferred that the exposed film unit be moved far enough into the bite of the rollers 40 and 42 to ensure that the rollers will be able to engage the film unit and, upon manual operation of the rollers, advance the film unit toward the exterior of the camera. Accordingly, any suitable means, e.g., a pair of cams, may be provided for pregapping the rollers 40 and 42 a sufficient distance away from each other so as to allow the leading end of the exposed film unit to be moved to a point slightly to the right (as viewed in FIG. 3) of a plane containing the axes of rollers 40 and 42. After the leading end of the film unit has been located as described, the cams could be moved to allow the rollers 40 and 42 to return to their normal position, thereby engaging the leading end of the film unit in their bite. The rollers 40 and 42 may then be rotated to advance the film unit toward the exterior of the camera while simultaneously spreading the contents of container 45 between the photosensitive and image-receiving elements of the film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   a film assemblage including
      a cassette having means defining an exit in one end of said cassette through which a film unit is adapted to be moved subsequent to exposure, an opening near an opposite end of said cassette and an exposure aperture;
      a plurality of thin, flexible film units located within said cassette in stacked relation with a foremost of said film units being adapted to be urged into a position adjacent said exposure aperture with a first edge of said foremost film unit in alignment with said exit and a second edge opposite said first edge positioned adjacent said opening;
   a camera including
      means for receiving said cassette;
      first film-advancing means adapted to extend into said opening for engaging said foremost film unit at said second edge thereof and moving said foremost film unit, subsequent to exposure, through said exit;
      second film-advancing means including a pair of rollers adapted to receive said first edge of said foremost film unit as it moves through said exit;
      motor means; and
      means coupled to said motor means for driving said first film-advancing means to move said first edge of said foremost film unit through said exit and for driving said second film-advancing means while said foremost film unit is in engagement therewith to rupture a container of processing liquid mounted on said foremost film unit and spread the contents thereof between elements of said foremost film unit as said foremost film unit is advanced toward the exterior of said camera.

2. Photographic apparatus as defined in claim 1 wherein said drive means is adapted to simultaneously drive said first and second film-advancing means.

3. Photographic apparatus as defined in claim 1 wherein said film-engaging means is mounted for reciprocating movement.

4. Photographic apparatus as defined in claim 2 wherein said first film-advancing means is mounted for reciprocating movement.

5. Photographic apparatus for use with a film assemblage of the type including a cassette having means defining an exit in one end thereof through which a film unit is adapted to be moved subsequent to exposure, an opening near an opposite end of the cassette and an exposure aperture, a plurality of thin, flexible film units located within the cassette in stacked relation with a foremost one of the film units being adapted to be urged into a position adjacent the exposure aperture with a first edge of the film unit in alignment with the exit, a second edge of the film unit opposite the first edge being in alignment with the opening and a photosensitive area of the film unit being located in alignment with the exposure aperture, said photographic apparatus comprising:
   means for locating the film assemblage in said photographic apparatus in position for exposure of the foremost film unit;
   means for exposing the foremost film unit through the exposure aperture in the cassette;
   first film-advancing means mounted in said photographic apparatus and adapted to extend into the opening in the cassette to drivingly engage the foremost film unit at the second edge thereof and thereby move the foremost film unit, subsequent to exposure, through the exit in the cassette;
   second film-advancing means mounted in said apparatus and adapted to drivingly engage the first edge of the foremost film unit after it moves through the exit;
   motor means; and
   means coupled to said motor means for driving said first film-advancing means to move the first edge of the foremost film unit through the exit in the cassette and for driving said second film-advancing means while the foremost film unit is in engagement therewith.

6. Photographic apparatus as defined in claim 5 wherein said drive means is adapted to simultaneously drive said first and second film-advancing means.

7. Photographic apparatus as defined in claim 5 wherein said first film-advancing means includes film-engaging means constructed to engage and move only one film unit at a time.

8. Photographic apparatus as defined in claim 5 wherein said first film-advancing means is mounted for reciprocating movement.

9. Photographic apparatus as defined in claim 8 wherein said first film-advancing means is constructed to engage and move only one film unit at a time.

10. Photographic apparatus as defined in claim 6 wherein said first film-advancing means is mounted for reciprocating movement.

11. Photographic apparatus as defined in claim 5 wherein said second film-advancing means includes a pair of rollers adapted to rupture a container of processing liquid mounted on the foremost film unit and spread the contents thereof between elements of the foremost film unit as the latter is advanced toward the exterior of said photographic apparatus.

12. A photographic method of exposing and processing a succession of discrete photographic film units arranged in stacked relation within a film cassette having means defining an exposure aperture through which the film units are adapted to be sequentially exposed, an exit through which a foremost film unit is movable subsequent to exposure and an opening through which motor operated film-advancing means are adapted to extend to engage the foremost film unit in said stack at a trailing edge thereof and move said foremost film unit subsequent to exposure through said exit and into engagement with pressure-applying means, said method comprising:

positioning said film cassette within photographic apparatus with said foremost film unit located in position to be moved into the focal plane of said photographic apparatus;

moving said foremost film unit into said focal plane;

resiliently supporting said stack of film units from the rear thereof to maintain said foremost film unit in said focal plane;

exposing said foremost film unit through said exposure aperture;

energizing said motor operated film-advancing means after a predetermined period of time has elapsed since termination of exposure to drivingly engage a trailing edge portion of said foremost film unit and move said foremost film unit, leading end first, through said exit and into engagement with said pressure-applying means; and operating said pressure-applying means in engagement with said exposed film unit to continue the movement thereof toward the exterior of said photographic apparatus while simultaneously spreading a processing liquid between elements of said exposed foremost film unit to initiate a diffusion transfer process.

13. Photographic apparatus for use with a film assemblage of the type including a cassette having means defining an exit in one end thereof through which a film unit is adapted to be moved subsequent to exposure, an opening near an opposite end of said cassette and an exposure aperture, a plurality of thin, flexible film units located within said cassette in stacked relation with a foremost one of said film units being adapted to be urged into a position adjacent said exposure aperture with a first edge of said film unit in alignment with said exit, a second edge of said film unit opposite said first edge being in alignment with said opening and a photosensitive area of said film unit being located in alignment with said exposure aperture, said photographic apparatus comprising:

means for locating the film assemblage in said photographic apparatus in position for exposure of the foremost film unit;

shutter means mounted within said photographic apparatus;

shutter release means for initiating operation of said shutter means to expose the the foremost film unit through the exposure aperture in the cassette;

first film-advancing means mounted in said photographic apparatus and adapted to extend into the opening in the cassette to drivingly engage the foremost film unit at the second edge thereof and thereby move the foremost film unit, subsequent to exposure, through the exit in the cassette;

second film-advancing means mounted in said apparatus and adapted to drivingly engage said first edge of the foremost film unit after it moves through the exit;

motor means energizable in response to actuation of said shutter release means for driving at least one of said first and second film-advancing means; and means coupled to said motor means for driving said first film-advancing means to move the first edge of the foremost film unit through the exit in the cassette and for driving said second film-advancing means while the foremost film unit is in engagement therewith, said motor means and said drive means being mounted wholly within the confines of said photographic apparatus.

14. A camera of the self-developing type for use with a disposable cassette, said cassette comprising a plurality of substantially flat film units disposed in a stacked array, each said film unit including a pod of processing liquid and a sheet of photosensitive material, means for defining an exposure aperture disposed in alignment with respect to said stacked array of film units, means for urging said stacked array of film units towards said exposure aperture, means defining an elongated slot passing through one end of said cassette and aligned with said film unit nearest said exposure aperture, said elongated slot having a depth only slightly greater than the thickness of one of said film units and less than the combined thickness of two film units to preclude the simultaneous advancement therethrough of more than one film unit, and means defining an opening in the cassette adjacent an edge of a film unit for receiving film advancement means, said camera comprising:

means for receiving the cassette, said receiving means including an opening complementary with the cassette exposure aperture when the cassette is operably positioned within said receiving means;

means for selectively exposing the forwardmost film unit through the opening and the cassette exposure aperture to record an image thereon;

means for initiating the advancement of the exposed film unit from the cassette through the slot, said advancement means positioned to operably engage the exposed film unit at the edge thereof furthermost removed from the slot in a manner precluding any misalignment of the opposite edge of the film unit with the slot;

roller means, positioned within said camera to receive the exposed film unit as it emerges from the cassette slot under the influence of said advancement means, for completing the advancement of the film unit from the cassette and for effecting the spreading of the processing liquid across the exposed film unit; and unitary mechanical means engageable with both said advancement means and said roller means for actuating said advancement means and said roller means in unison to effect the advancement of the exposed film unit from the cassette and through said roller means.

15. The invention of claim 14 wherein said unitary mechanical means includes means for disenabling said advancement means to move another film unit out of the cassette until the previous film unit has moved out of engagement with said roller means.

16. The invention of claim 15 wherein said unitary mechanical means includes means for overriding said disenabling means.

17. The invention of claim 16 wherein said overriding means includes a cam.

\* \* \* \* \*